(12) United States Patent  
Albrecht

(10) Patent No.: US 10,909,872 B2
(45) Date of Patent: Feb. 2, 2021

(54) SYSTEMS AND METHODS TO PROVIDE WELD TRAINING

(71) Applicant: ILLINOIS TOOL WORKS INC., Glenview, IL (US)

(72) Inventor: Bruce Patrick Albrecht, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 467 days.

(21) Appl. No.: 15/400,509

(22) Filed: Jan. 6, 2017

(65) Prior Publication Data

US 2017/0200384 A1    Jul. 13, 2017

Related U.S. Application Data

(60) Provisional application No. 62/276,290, filed on Jan. 8, 2016.

(51) Int. Cl.
*G09B 19/24* (2006.01)
*G09B 9/00* (2006.01)
*B23K 9/095* (2006.01)

(52) U.S. Cl.
CPC ............ *G09B 9/00* (2013.01); *G09B 19/24* (2013.01); *B23K 9/0953* (2013.01)

(58) Field of Classification Search
CPC ........ G09B 19/24; G09B 19/003; B23K 9/09; B23K 9/095; B23K 9/0953
See application file for complete search history.

(56) References Cited

U.S. PATENT DOCUMENTS 4,453,085 A    6/1984 Pryor
4,482,960 A    11/1984 Pryor
(Continued)

FOREIGN PATENT DOCUMENTS

CN    1469791    1/2004
CN    1756616    4/2006
(Continued)

OTHER PUBLICATIONS

Klinker, Gudrun, Augmented Reality im prktischen Einsatz, Oct. 10, 2012 (40 pages).
(Continued)

*Primary Examiner* — Robert J Utama
(74) *Attorney, Agent, or Firm* — McAndrews, Held & Malloy, Ltd.

(57) ABSTRACT

Methods and apparatus for weld training are provided. An example weld training system includes a display device, an input device, a processor, and a machine readable storage device storing machine readable instructions. The instructions may be executed by the processor to: enable the user to design a weld procedure by selecting weld parameters; enable the user to simulate setting up a simulated physical welding environment; simulate a welding operation on a simulated workpiece using the selected weld parameters in a welding model and a setup of the simulated physical welding environment to determine a modeled result of the welding operation; display a simulation animation of the welding operation on the display device according to the simulation; and display the modeled result on the display device using at least one of an image of a surface of a weld bead or a cross-section of the weld bead and the workpiece.

22 Claims, 10 Drawing Sheets

(56) References Cited

U.S. PATENT DOCUMENTS

| | | | |
|---|---|---|---|
| 4,602,163 A | 7/1986 | Pryor | |
| 4,654,949 A | 4/1987 | Pryor | |
| 4,753,569 A | 6/1988 | Pryor | |
| 4,769,700 A | 9/1988 | Pryor | |
| 4,788,440 A | 11/1988 | Pryor | |
| 5,148,591 A | 9/1992 | Pryor | |
| 5,506,682 A | 4/1996 | Pryor | |
| 5,602,967 A | 2/1997 | Pryor | |
| 5,608,847 A | 3/1997 | Pryor | |
| 5,956,417 A | 9/1999 | Pryor | |
| 6,044,183 A | 3/2000 | Pryor | |
| 6,051,805 A | 4/2000 | Vaidya | |
| 6,107,601 A | 8/2000 | Shimogama | |
| 6,163,946 A | 12/2000 | Pryor | |
| 6,167,607 B1 | 1/2001 | Pryor | |
| 6,230,327 B1 | 5/2001 | Briand | |
| 6,271,500 B1* | 8/2001 | Hirayama | B23K 9/0953 219/130.01 |
| 6,301,763 B1 | 10/2001 | Pryor | |
| 6,314,631 B1 | 11/2001 | Pryor | |
| 6,315,186 B1 | 11/2001 | Friedl | |
| 6,317,953 B1 | 11/2001 | Pryor | |
| 6,441,342 B1 | 8/2002 | Hsu | |
| 6,476,354 B1 | 11/2002 | Jank | |
| 6,479,793 B1 | 11/2002 | Wittmann | |
| 6,750,428 B2 | 6/2004 | Okamoto | |
| 7,358,458 B2 | 4/2008 | Daniel | |
| 7,523,069 B1 | 4/2009 | Friedl | |
| 8,144,193 B2 | 3/2012 | Melikian | |
| 8,274,013 B2 | 9/2012 | Wallace | |
| 8,428,926 B2* | 4/2013 | Choquet | G09B 19/003 703/11 |
| 8,512,043 B2 | 8/2013 | Choquet | |
| 8,569,646 B2* | 10/2013 | Daniel | B23K 9/0953 219/110 |
| 8,648,903 B2 | 2/2014 | Loipetsberger | |
| 8,657,605 B2 | 2/2014 | Wallace | |
| 8,680,432 B2 | 3/2014 | Uecker | |
| 8,680,434 B2 | 3/2014 | Stoger | |
| 8,747,116 B2 | 6/2014 | Zboray | |
| 8,777,629 B2 | 7/2014 | Kreindl | |
| 8,834,168 B2 | 9/2014 | Peters | |
| 8,851,896 B2 | 10/2014 | Wallace | |
| 8,884,177 B2 | 11/2014 | Daniel | |
| 8,911,237 B2 | 12/2014 | Postlethwaite | |
| 8,915,740 B2 | 12/2014 | Zboray | |
| 8,987,628 B2 | 3/2015 | Daniel | |
| 8,992,226 B1 | 3/2015 | Leach | |
| 9,011,154 B2 | 4/2015 | Kindig | |
| 9,012,802 B2 | 4/2015 | Daniel | |
| 9,050,678 B2 | 6/2015 | Daniel | |
| 9,050,679 B2 | 6/2015 | Daniel | |
| 9,073,138 B2 | 7/2015 | Wills | |
| 9,089,921 B2 | 7/2015 | Daniel | |
| 9,101,994 B2 | 8/2015 | Albrecht | |
| 9,104,195 B2* | 8/2015 | Daniel | G05B 19/41865 |
| 9,196,169 B2 | 11/2015 | Wallace | |
| 9,218,745 B2 | 12/2015 | Choquet | |
| 9,221,117 B2 | 12/2015 | Conrardy | |
| 9,230,449 B2 | 1/2016 | Conrardy | |
| 9,269,279 B2 | 2/2016 | Penrod | |
| 9,280,913 B2 | 3/2016 | Peters | |
| 9,293,056 B2 | 3/2016 | Zboray | |
| 9,293,057 B2 | 3/2016 | Zboray | |
| 9,318,026 B2 | 4/2016 | Peters | |
| 9,330,575 B2* | 5/2016 | Peters | G09B 5/00 |
| 9,336,686 B2 | 5/2016 | Peters | |
| 9,352,411 B2 | 5/2016 | Batzler | |
| 9,368,045 B2 | 6/2016 | Becker | |
| 9,468,988 B2 | 10/2016 | Daniel | |
| 9,483,959 B2 | 11/2016 | Wallace | |
| 9,583,014 B2 | 2/2017 | Becker | |
| 9,583,023 B2 | 2/2017 | Becker et al. | |
| 9,589,481 B2 | 3/2017 | Becker et al. | |
| 2003/0163219 A1* | 8/2003 | Flesher | G09B 19/003 700/185 |
| 2006/0090135 A1 | 4/2006 | Fukuda | |
| 2008/0038702 A1* | 2/2008 | Choquet | A61B 5/1124 434/260 |
| 2009/0231423 A1 | 9/2009 | Becker | |
| 2010/0048273 A1* | 2/2010 | Wallace | G09B 19/24 463/7 |
| 2010/0062406 A1 | 3/2010 | Zboray | |
| 2010/0079356 A1 | 4/2010 | Hoellwarth | |
| 2011/0006047 A1 | 1/2011 | Penrod | |
| 2011/0083241 A1 | 4/2011 | Cole | |
| 2011/0117527 A1 | 5/2011 | Conrardy | |
| 2012/0006800 A1 | 1/2012 | Ryan | |
| 2012/0180180 A1 | 7/2012 | Steve | |
| 2012/0189993 A1 | 7/2012 | Kindig | |
| 2013/0163090 A1 | 6/2013 | Yu | |
| 2013/0189658 A1 | 7/2013 | Peters | |
| 2013/0200882 A1 | 8/2013 | Almalki | |
| 2013/0203029 A1 | 8/2013 | Choquet | |
| 2013/0206741 A1 | 8/2013 | Pfeifer | |
| 2013/0252214 A1 | 9/2013 | Choquet | |
| 2013/0288211 A1 | 10/2013 | Patterson | |
| 2014/0014638 A1 | 1/2014 | Artelsmair | |
| 2014/0017642 A1 | 1/2014 | Postlethwaite | |
| 2014/0042135 A1 | 2/2014 | Daniel | |
| 2014/0042136 A1 | 2/2014 | Daniel | |
| 2014/0042137 A1 | 2/2014 | Daniel | |
| 2014/0065584 A1 | 3/2014 | Wallace | |
| 2014/0205976 A1 | 7/2014 | Peters | |
| 2014/0220522 A1 | 8/2014 | Peters | |
| 2014/0234813 A1 | 8/2014 | Peters | |
| 2014/0263224 A1 | 9/2014 | Becker | |
| 2014/0263227 A1 | 9/2014 | Daniel | |
| 2014/0272835 A1 | 9/2014 | Becker | |
| 2014/0272836 A1 | 9/2014 | Becker | |
| 2014/0272837 A1 | 9/2014 | Becker | |
| 2014/0272838 A1 | 9/2014 | Becker | |
| 2014/0315167 A1 | 10/2014 | Kreindl | |
| 2014/0322684 A1 | 10/2014 | Wallace | |
| 2014/0346158 A1 | 11/2014 | Matthews | |
| 2014/0349256 A1 | 11/2014 | Connor | |
| 2015/0034618 A1 | 2/2015 | Langeder | |
| 2015/0056584 A1* | 2/2015 | Boulware | B23K 9/173 434/234 |
| 2015/0056585 A1* | 2/2015 | Boulware | B23K 9/16 434/234 |
| 2015/0072323 A1 | 3/2015 | Postlethwaite | |
| 2015/0122781 A1* | 5/2015 | Albrecht | B23K 9/0953 219/73 |
| 2015/0125836 A1 | 5/2015 | Daniel | |
| 2015/0154884 A1 | 6/2015 | Salsich | |
| 2015/0170539 A1 | 6/2015 | Barrera | |
| 2015/0190875 A1 | 7/2015 | Becker | |
| 2015/0190876 A1 | 7/2015 | Becker | |
| 2015/0190887 A1 | 7/2015 | Becker | |
| 2015/0190888 A1 | 7/2015 | Becker | |
| 2015/0194072 A1 | 7/2015 | Becker | |
| 2015/0194073 A1 | 7/2015 | Becker | |
| 2015/0209887 A1 | 7/2015 | DeLisio | |
| 2015/0228203 A1 | 8/2015 | Kindig | |
| 2015/0235565 A1 | 8/2015 | Postlethwaite | |
| 2015/0248845 A1 | 9/2015 | Postlethwaite | |
| 2015/0264992 A1 | 9/2015 | Happel | |
| 2015/0268663 A1 | 9/2015 | Daniel | |
| 2015/0320601 A1 | 11/2015 | Gregg | |
| 2015/0325153 A1 | 11/2015 | Albrecht | |
| 2015/0348439 A1 | 12/2015 | Zboray | |
| 2015/0348441 A1 | 12/2015 | Zboray | |
| 2015/0356888 A1 | 12/2015 | Zboray | |
| 2015/0375324 A1 | 12/2015 | Becker | |
| 2015/0375327 A1 | 12/2015 | Becker | |
| 2015/0379894 A1 | 12/2015 | Becker | |
| 2016/0012750 A1 | 1/2016 | Wallace | |
| 2016/0039034 A1 | 2/2016 | Becker | |
| 2016/0039053 A1 | 2/2016 | Becker | |
| 2016/0049085 A1 | 2/2016 | Beeson | |
| 2016/0093233 A1 | 3/2016 | Boulware | |

(56) References Cited

U.S. PATENT DOCUMENTS

| | | | |
|---|---|---|---|
| 2016/0114418 A1* | 4/2016 | Jones | B62D 57/024 |
| | | | 219/124.1 |
| 2016/0125592 A1 | 5/2016 | Becker | |
| 2016/0125593 A1 | 5/2016 | Becker | |
| 2016/0125594 A1 | 5/2016 | Becker | |
| 2016/0125761 A1 | 5/2016 | Becker | |
| 2016/0125762 A1 | 5/2016 | Becker | |
| 2016/0125763 A1 | 5/2016 | Becker | |
| 2016/0125764 A1 | 5/2016 | Becker | |
| 2016/0155358 A1 | 6/2016 | Zboray | |
| 2016/0155359 A1 | 6/2016 | Zboray | |
| 2016/0155360 A1 | 6/2016 | Zboray | |
| 2016/0155361 A1 | 6/2016 | Peters | |
| 2016/0171906 A1 | 6/2016 | Matthews | |
| 2016/0189559 A1 | 6/2016 | Peters | |
| 2016/0203732 A1 | 7/2016 | Wallace | |
| 2016/0203733 A1 | 7/2016 | Wallace | |
| 2016/0203734 A1 | 7/2016 | Boulware | |
| 2016/0203735 A1 | 7/2016 | Boulware | |
| 2016/0236303 A1 | 8/2016 | Matthews | |
| 2016/0267806 A1 | 9/2016 | Hsu | |
| 2016/0288236 A1 | 10/2016 | Becker | |
| 2016/0307460 A1 | 10/2016 | Peters | |
| 2016/0321954 A1 | 11/2016 | Peters | |
| 2016/0343268 A1 | 11/2016 | Postlethwaite | |
| 2016/0358503 A1 | 12/2016 | Batzler | |
| 2016/0361774 A9 | 12/2016 | Daniel | |
| 2016/0365004 A1 | 12/2016 | Matthews | |
| 2017/0036288 A1* | 2/2017 | Albrecht | B23K 9/0953 |
| 2017/0046974 A1 | 2/2017 | Becker et al. | |
| 2017/0046977 A1 | 2/2017 | Becker et al. | |
| 2017/0046982 A1 | 2/2017 | Wallace | |
| 2017/0200384 A1* | 7/2017 | Albrecht | G09B 19/24 |
| 2019/0121934 A1* | 4/2019 | Uyeda | G06F 17/5095 |

FOREIGN PATENT DOCUMENTS

| | | |
|---|---|---|
| CN | 101419755 | 4/2009 |
| CN | 102171744 | 8/2011 |
| CN | 102271854 | 12/2011 |
| CN | 102448651 | 5/2012 |
| CN | 103747910 | 4/2014 |
| CN | 103996322 | 8/2014 |
| CN | 104039493 | 9/2014 |
| CN | 202741926 | 2/2015 |
| CN | 104620304 | 5/2015 |
| CN | 104708174 | 6/2015 |
| CN | 104919691 | 9/2015 |
| CN | 105160645 | 12/2015 |
| CN | 105210131 | 12/2015 |
| EP | 2801966 | 11/2014 |
| JP | 2004343937 A * | 12/2004 |
| WO | 2005102230 | 11/2005 |
| WO | 2014140682 | 9/2014 |
| WO | 2015066592 | 5/2015 |

OTHER PUBLICATIONS

Sandor, C., Klinker, G., A rapid prototyping software infrastructure for user interfaces in ubiquitous augmented reality, Pers Ubiquit Compu (2005) 9 169-185.
ARVIKA Forum Vorstellung Projeckt PAARA, BMW Group Virtual Reality Center, Nuernberg, 2003.
Invertig.Pro Digital. Sep. 16, 2013.
Rehm Welding Technology, Invertig.Pro Digital, Sep. 16, 2013.
Rehm Welding Technology, Product Range, Aug. 2013.
Fite-Georgel, Pierre; "Is there a Reality in Industrial Augmented Reality?" 10th IEEE International Symposium on Mixed and Augmented Reality (ISMAR), 2011.
Int'l Search Report and Written Opinion for Appln No. PCT/US2017/012563 dated Mar. 22, 2017 (12 pages).
Canadian Office Action Appln. No. 3,010,814 dated Mar. 21, 2019.
Int'l Search Report and Written Opinion Application No. PCT/US2017/012558 dated Mar. 23, 2017 (12 pages).
Mrovlje, etal. "Distance measuring based on stereoscopic pictures". 9th International PhD Workshop on Systems and Control: Young Generation Viewpoint 1.-3. Oct. 2008, Izola, Slovenia (Year: 2008).
Petrovai etal, "A stereovision based approach for detecting and tracking lane and forward obstacles on mobile devices". 2015 IEEE Intelligent Vehicles Symposium (IV) Jun. 28-Jul. 1, 2015. COEX, Seoul, Korea (Year 2015).
Wang et al. "Stereo vision-based depth of field rendering on a mobile device". Journal of Electronic Imaging 23(2), 023009 (Mar.-Apr. 2014) (Year: 2014).
European Office Action Appln No. 17701393.5 dated Aug. 7, 2019 (6 pgs).
Tig Welder How to Play, www.tradesgamer.com, Nov. 17, 2011.
NAMeS Users Guide, N A Tech Neural Applications, Copyright 1997, 1998, 1999, 2000 Golden, CO (123 pages).
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Klinker, Gudrun, Intelligent Welding Gun, 2002.

* cited by examiner

SYSTEMS AND METHODS TO PROVIDE WELD TRAINING

RELATED APPLICATIONS

The application claims priority to U.S. Provisional Patent Application Ser. No. 62/276,290, filed Jan. 8, 2016, entitled "Weld Training Systems and Methods." The entirety of U.S. Provisional Patent Application Ser. No. 62/276,290 is incorporated herein by reference.

BACKGROUND

Weld training systems are used to provide training to welders who are unfamiliar with welding and/or with certain aspects of welding. Conventional weld training systems include suites of sensors and/or have very precise positioning requirements to ensure proper tracking of training.

BRIEF SUMMARY

Systems and methods are provided for weld training, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

The figures are not necessarily to scale. Where appropriate, similar or identical reference numbers are used to refer to similar or identical components.

DETAILED DESCRIPTION OF THE INVENTION

Figure 1:
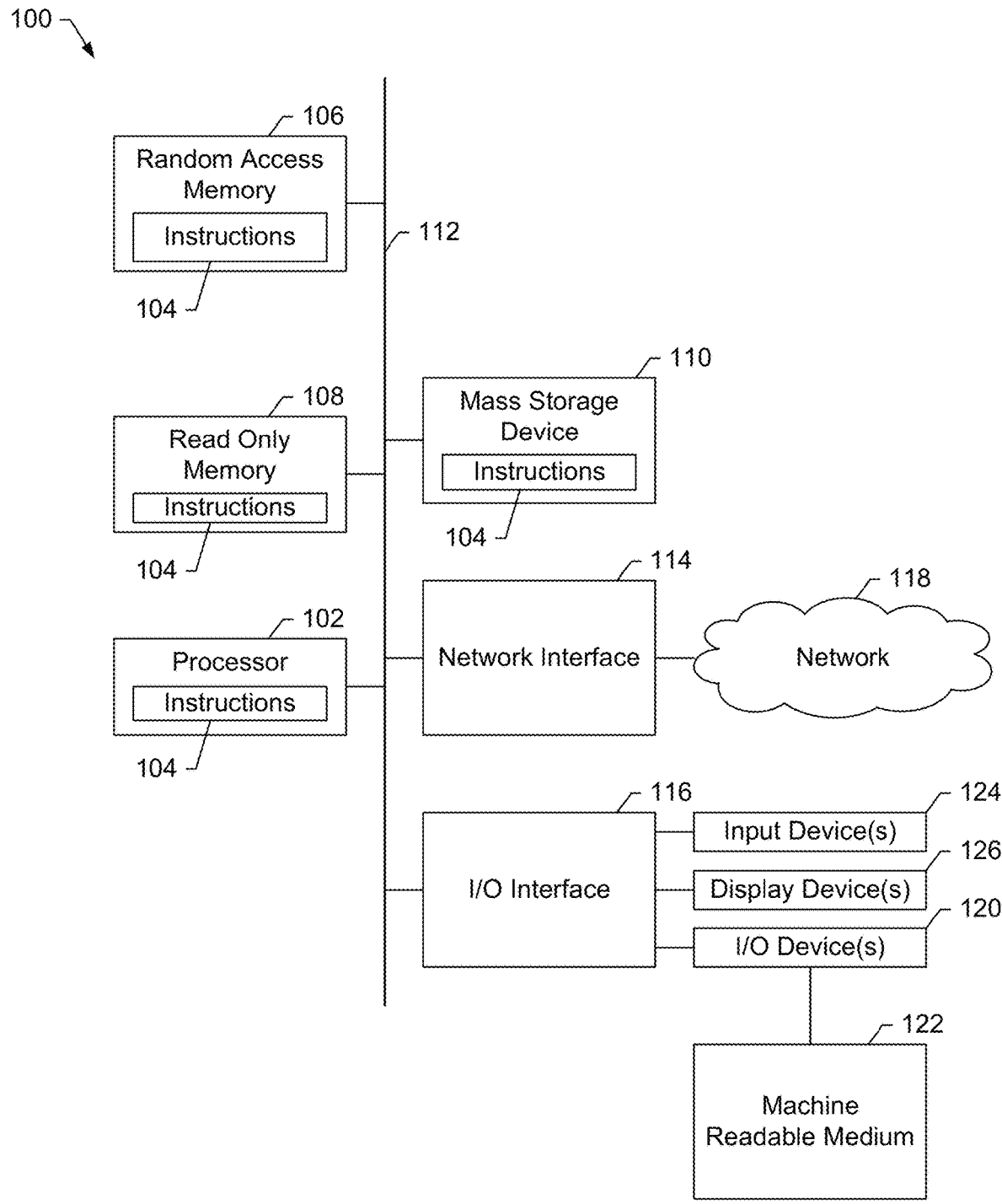
FIG. 1 is a block diagram of an example implementation of a computing device configured to implement a weld training system, in accordance with aspects of this disclosure.

"Realistic" weld training systems that provide feedback to trainee welders have made great advancements in recent years. However, such realistic weld training systems can be very costly. Disclosed examples are capable of providing low cost or no cost weld training by using a reduced-complexity weld training system to teach fundamental concepts of welding for which a high degree of realism offered by conventional weld training systems is unnecessary.

Example weld training systems disclosed herein familiarize a user with welding environments, without necessarily providing the user with the opportunity to physically perform or mimic a welding operation. Weld training systems disclosed herein enable the user to navigate one or more three-dimensional welding environments, select equipment and/or materials, manipulate the user interfaces of welding equipment, physically set up a welding operation, and/or any other activities involved with performing welding.

As used herein, the term "real-time" refers to performance of a process or other action relating to a system in which input data is processed substantially immediately (e.g., within milliseconds, as soon as possible, etc.) so that the result of processing is available virtually immediately as feedback. In this regard, "real-time" is used on contradistinction to post-processing.

As used herein, a weld cell refers to a site at which welding occurs (e.g., simulated or actual welding). A simulated weld cell refers to a weld cell in which a simulated weld may occur, and may include a simulated power supply, simulated gas supply, simulated utility power access, a simulated wire feeder, a simulated weld torch, a simulated work clamp, a simulated fixture, simulated parts, and/or any other appropriate simulated objects.

Disclosed example weld training devices include a display device, an input device, a processor, and a machine readable storage device storing machine readable instructions. The machine readable instructions may be executed the processor to demonstrate to a user an effect of a combination of welding-related variables. The processor executes the instructions to enable the user to design a weld procedure using the input device by selecting weld parameters including weld current and weld voltage, and to enable the user to simulate setting up a simulated physical welding environment using the input device. The processor executes the instructions to simulate a welding operation on a simulated workpiece using the selected weld parameters in a welding model and a setup of the simulated physical welding environment to determine a modeled result of the welding operation. The processor executes the instructions to display a simulation animation of the welding operation on the display device according to the simulation, and to display the modeled result of the weld on the display device using at least one of an image of a surface of a weld bead or a cross-section of the weld bead and the simulated workpiece.

Disclosed example non-transitory machine readable storage media store machine readable instructions which may be executed by a processor to demonstrate to a user an effect of a combination of welding-related variables. The processor executes the instructions to enable a user to design a weld procedure using an input device by selecting weld parameters including weld current and weld voltage, simulate, a welding operation on a simulated workpiece using the selected weld parameters in a welding model to determine a physical result of the welding operation, display a simulation animation of the welding operation on a display device according to the simulation, and displaying the physical result of the weld on the display device using at least one of an image of a surface of a weld bead or a cross-section of the weld bead and the simulated workpiece.

In some examples, the instructions cause the processor to enable the user to select a welding power supply model, and to simulate the welding operation based on the selection of the welding power supply model. In some examples, the instructions cause the processor to enable the user to select a wire feed speed, and to simulate the welding operation based on the selection of the wire feed speed. In some examples, the instructions cause the processor to enable the user to select at least one of a workpiece material or a filler type, and to simulate the welding operation based on the selection of the workpiece material or the selection of the filler type.

In some examples, the instructions cause the processor to enable the user to select a torch travel speed, and to simulate the welding operation based on the selection of the selection of the torch travel speed. In some such examples, the instructions cause the processor to enable the user to control the torch travel speed during the simulation using the input device, and to update the simulation of the welding operation based on changes in the torch travel speed. In some examples, the instructions cause the processor to enable the user to add variation to at least one of a torch travel speed or a contact tip to work distance.

In some examples, the modeled result includes a visual representation of at least one of a weld puddle, slag generated by the welding operation, spatter generated by the welding operation, or burn through generated by the welding operation. In some examples, the simulation animation includes a visual representation of at least one of a weld puddle, slag generated by the welding operation, spatter generated by the welding operation, or burn through generated by the welding operation. In some examples, the weld training device comprises a personal computer, a laptop computer, a server, a tablet computer, or a smartphone. In some examples, the input device is at least one of a keyboard, a mouse, or a touchscreen.

In some examples, the instructions cause the processor to enable the user to change at least one of the weld current, the weld voltage, or a wire feed speed during the simulation, and to update the simulation of the welding operation based on changes in the weld current, the weld voltage, or the wire feed speed. In some examples, the instructions cause the processor to enable the user to specify at least one of a welding gas type, a gas flow rate, or an ambient airflow, and to simulate the welding operation based on the selection of the welding gas type or the selection of the gas flow rate, or the ambient airflow.

In some examples, the instructions cause the processor to display information about an anomaly present in the weld determined based on the simulation. In some such examples, the information about the anomaly includes at least one of a cause of the anomaly, a suggested change in one or more of the welding-related variables to avoid the anomaly, or a location of the anomaly in the image of the weld bead or in the cross-section of the weld bead. In some examples, the instructions cause the processor to simulate is performed without further user input after the selection of the weld procedure is accepted. In some examples, the instructions cause the processor to include at least one of an operator or a robot in the simulation animation.

In some examples, the instructions cause the processor to enable the user to simulate setting up the simulated physical welding environment by at least one of: selecting a welding task from a plurality of welding tasks, reviewing a selecting a welding gas from a plurality of welding gas bottles in the weld cell, selecting at least one of a wire type or a gas, or going through set up procedure using hard goods and gas.

In some examples, the instructions cause the processor to enable the user to simulate the setting up of the simulated physical welding environment by simulating an interface to enable the user to at least one of: check a welding gas bottle for connection problems; check electrical connections for electrical issues; load a filler reel into a wire feeder; installing a contact tip, a diffuser, and a nozzle; installing a wire liner; attaching a gas supply to welding equipment; installing an electrode reel; connecting a work clamp to a workpiece; preparing the workpiece; or connecting a power supply to the wire feeder.

In some examples, the instructions cause the processor to simulate the simulated physical welding environment by including virtual representations of one or more of: a welding gas bottle, a gas regulator, a gas hose, a wire feeder, welding electrodes, a drive roll, access to utility power, a torch, a contact tip, a work clamp, a fume extraction mechanism, a liquid torch cooler, and welding protective equipment. In some examples, the instructions cause the processor to download welding parameters configured by the user using the input device to a real physical environment or a real work cell. In some examples, the instructions are to cause the processor to download a weld procedure specification configured by the user using the input device to a quality system.

FIG. 1 is a block diagram of an example implementation of a computing device configured to implement a weld training system 100 in accordance with aspects of this disclosure. The example weld training system 100 of FIG. 1 may be any type of system that uses a microcontroller or microprocessor to provide one or more features by executing software, firmware, and/or any other machine readable code. Example computing devices include a personal computer, a laptop computer, a server, a tablet computer, or a smartphone.

The example weld training system 100 of FIG. 1 includes a processor 102. The example processor 102 may be any specialized or general-purpose microcontroller, such as a system-on-a-chip (SoC), graphics processing unit, and/or digital signal processor, from any manufacturer. The processor 102 executes machine readable instructions 104 that may be stored locally at the processor (e.g., in an included cache), in a random access memory 106 (or other volatile memory), in a read only memory 108 (or other non-volatile memory such as FLASH memory), and/or in a mass storage device 110. The example mass storage device 110 may be a hard drive, a solid state storage drive, a hybrid drive, a RAID array, and/or any other mass data storage device.

A bus 112 enables communications between the processor 102, the RAM 106, the ROM 108, the mass storage device 110, a network interface 114, and/or an input/output interface 116.

The example network interface 114 includes hardware, firmware, and/or software to connect the weld training system 100 to a communications network 118 such as the Internet. For example, the network interface 114 may include IEEE 802.X-compliant wireless and/or wired communications hardware for transmitting and/or receiving communications.

The example I/O interface 116 of FIG. 1 includes hardware, firmware, and/or software to connect one or more input/output devices 120 to the processor 102 for providing input to the processor 102 and/or providing output from the processor 102. For example, the I/O interface 116 may include a graphics processing unit for interfacing with a display device, a universal serial bus port for interfacing with one or more USB-compliant devices, a FireWire, a field bus, and/or any other type of interface. The example weld training system 100 of FIG. 1 includes one or more input device(s) 124 as an input device and one or more display device(s) 126 as an output device. Example input device(s) include keyboard, a mouse, and/or a touchscreen.

The I/O device(s) 120 may also include a keyboard, a keypad, a mouse, a trackball, a pointing device, a microphone, an audio speaker, an optical media drive, a multi-touch touch screen, a gesture recognition interface, a magnetic media drive, and/or any other type of input and/or output device.

The example weld training system 100 may access a non-transitory machine readable medium 122 via the I/O interface 116 and/or the I/O device(s) 120. Examples of the machine readable medium 122 of FIG. 1 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Consistent with embedded systems, one or more of the processor 102, the random access memory 106, the read-only memory 108, the mass storage device 110, the bus 112, the network interface 114, and/or the I/O interface 116 may be implemented in a single package.

The weld training system 100 may be implemented on a computing device as, for example, a welding simulator "game" or other three-dimensional simulator to enable users (e.g., players) to familiarize themselves with welding-type environments. For example, the weld training system 100 may enable the user to navigate one or more three-dimensional welding environments, select equipment and/or materials, manipulate the user interfaces of welding equipment, physically set up a welding operation, and/or any other activities involved with performing welding.

In some examples, the weld training system 100 enables the user to design a weld procedure using the input device(s) 124 by selecting weld parameters including weld current and weld voltage. For example, the user may be provided with an interface to specify a particular weld to be performed. Such a specification may be set by one or more external objectives, such as a project specified by a supervisor, which may or may not require the user to interpret the objectives to design the specification.

The weld training system 100 enables the user to simulate setting up a simulated physical welding environment using the input device(s) 124. For example, the simulation of a physical welding environment may be based on the designed weld procedure, and/or may take place in one or more general and/or specialized welding environments. Examples of such environments include a hobbyist's garage, an automotive repair shop, a manufacturing facility, a robotic weld cell, a construction site (e.g., a pipeline construction site, a building construction site, a shipyard, etc.), and/or any other physical welding environment. Different welding environments may appear differently to the user in the simulation, may be laid out differently for the purposes of virtually traversing the physical environment, may include different welding equipment and/or materials for selection by the user, and/or may have other differences.

The simulating of setting up the physical welding environment may include, for example, selecting welding equipment (e.g., welding power supply, wire feeder, welding torch, induction heating unit, etc.) and/or materials (e.g., shielding gas, welding electrode, etc.). The simulation may include physically configuring the welding equipment and/or materials, such as moving the welding equipment and/or the materials to the work site, connecting the relevant pieces of equipment to one another, supplying consumable material to the welding equipment. The simulation may include manipulating the interface(s) of the equipment, such as the user interfaces of a welding power supply or a wire feeder, to configure the equipment for the appropriate settings.

The weld training system 100 simulates a welding operation on a simulated workpiece using the selected weld parameters in a welding model and a setup of the simulated physical welding environment to determine a modeled result of the welding operation. In some examples, the user initiates the simulation and is then presented with a view of a weld operator performing the welding operation without further input from the user. In other examples, the weld training system 100 enables the user to make adjustments to one or more parameters during the welding operation to observe the effects on the welding operation. In either case, the weld training system 100 performs the simulation based on the previous performance and/or configuration by the user.

For example, if the user incorrectly configures the welding equipment such that the equipment cannot perform a weld, the simulation does not weld. If the user configures the equipment such that the weld operator is capable of performing welding, the weld training system 100 simulates the welding operation using the configuration (even if incorrect or not preferred, such as configuring the welding equipment as DCEP when DCEN or AC is a preferred mode of operation).

The weld training system 100 displays a simulation animation of the welding operation on the display device(s) 126 according to the simulation. In some examples, the simulation animation is presented concurrently with the simulation to enable the user to make real-time adjustments to the parameters. In response to adjustments to the parameters, the weld training system 100 continues the simulation of the welding operation with the modified parameters. For example, if a user changes the weld voltage from 18 VDC to 24 VDC halfway into the welding simulation, the first half of the welding simulation remains a simulation at 18 VDC and the remaining portions of the welding simulation are simulated using 24 VDC (absent further changes by the user).

When the welding operation is completed, the weld training system 100 displays the modeled result of the weld on the display device(s) 126 using at least one of an image of a surface of a weld bead or a cross-section of the weld bead and the workpiece. In this manner, the user may review the results of the weld completed using the selected equipment and/or materials and the configuration of the welding operation. In this manner, the weld training system 100 may familiarize a user with welding concepts separately from the user performing actual welding. Such a system can reduce expensive training time for new welders by providing an inexpensive method of becoming accustomed to the welding environment, thereby enabling more expensive training time (e.g., with welding instructors) to be focused more directly on actual welding technique instead of spending the more expensive training time on familiarizing the new welders with the welding concepts.

The weld training system 100 may enable the user to simulate setting up a simulated physical welding environment by one or more of: selecting a welding task from a plurality of welding tasks, reviewing a selecting a welding gas from a plurality of welding gas bottles in the weld cell, selecting at least one of a wire type or a gas, and/or going through set up procedure using hard goods and gas. In some examples, the weld training system 100 simulates the setting up of the simulated physical welding environment by simulating an interface to enable the user to at least one of: check a welding gas bottle for connection problems; check electrical connections for electrical issues; load a filler reel into a wire feeder; installing a contact tip, a diffuser, and a nozzle; installing a wire liner; attaching a gas supply to welding equipment; such as attaching a gas supply hose, installing or replacing an electrode reel, installing or replacing a wire liner, connecting a work clamp to a workpiece, preparing a workpiece, and/or connecting a power supply to a wire feeder.

Figure 2:
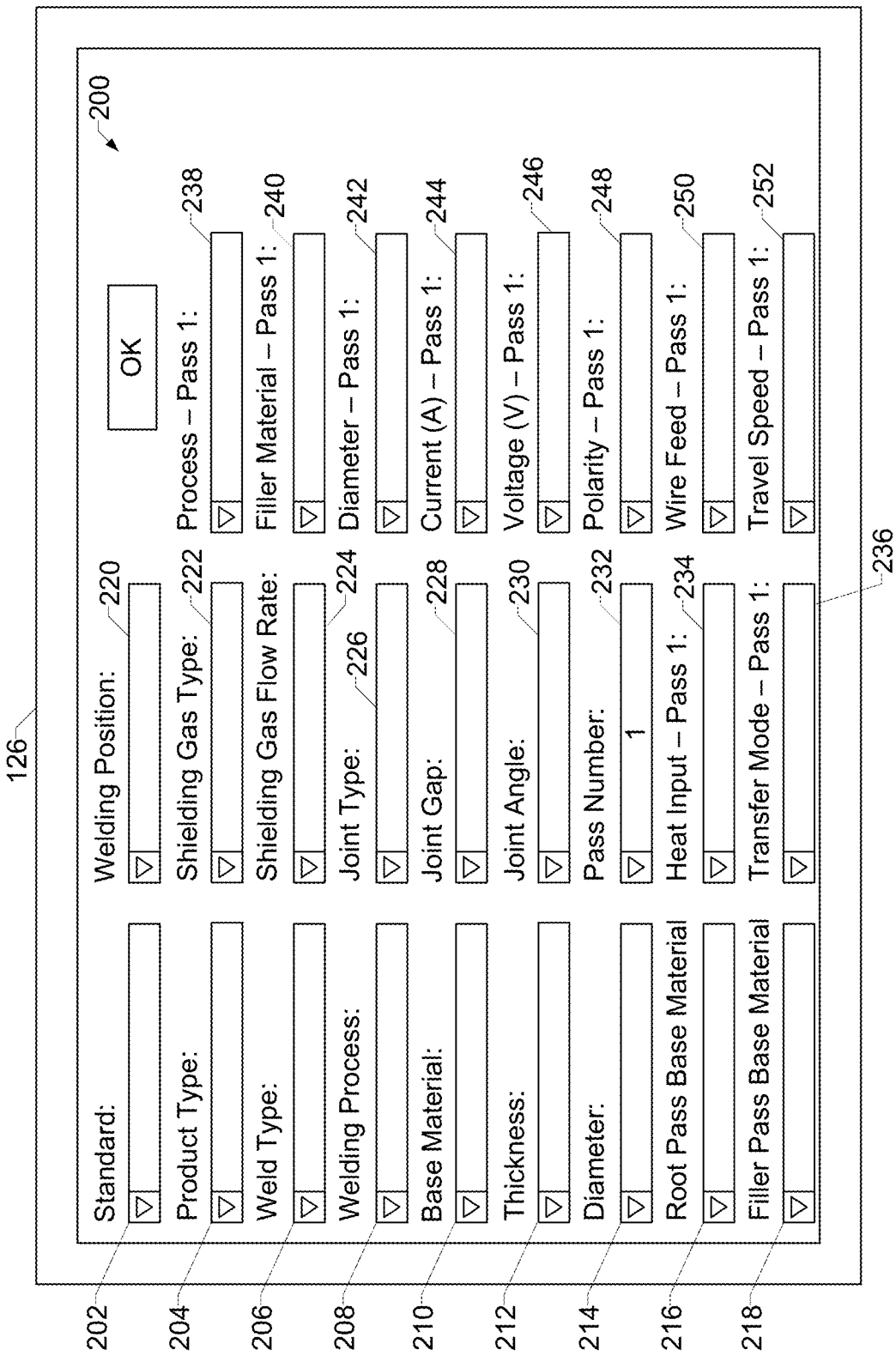
FIG. 2 illustrates a view displayed by the example weld training system of FIG. 1 to enable a user to design a weld procedure using the input device(s) of the weld training system by selecting weld parameters.

FIG. 2 illustrates a view 200 displayed by the example weld training system 100 of FIG. 1 (e.g., the display device(s) 126) to enable a user to design a weld procedure using the input device(s) 124 of the weld training system by selecting weld parameters. The view 200 may be presented on the display device(s) 126 during a welding environment simulation. For instance, the user of the weld training system 100 may select a weld procedure interface to bring up the view 200.

The example view 200 includes information relevant to creating a weld procedure, such as a weld procedure specification (WPS). The view 200 includes multiple selection objects, such as drop-down boxes having relevant selectable items, to select the data for entry into the weld procedure. Examples of such information illustrated in FIG. 2 include a welding standard 202 or welding code (e.g., American Welding Society, etc.), a product type 204, a weld type 206, a welding process 208 (e.g., GMAW, GTAW, SMAW, SAW, FCAW, etc.), a base material type 210 (e.g., steel, aluminum, etc.), a base material thickness 212, a base material diameter 214, a root pass base material 216, a filler pass base material 218, a welding position 220 (e.g., horizontal, vertical, overhead, etc.), a shielding gas type 222 (e.g., CO2, Argon, etc.), a shielding gas flow rate 224, a joint type 226 (e.g., fillet, square, V joint, etc.), a joint gap 228, and a joint angle 230.

The example interface illustrated in FIG. 2 also enables a user to specify a set of information for each of multiple passes. For example, the user may specify the pass number 232 and, for each selected pass number 232, specify a heat input 234 (e.g., in Joules/inch or similar metric), a transfer mode 236 (e.g., spray, pulse, etc.), a process type 238 (e.g., GMAW, GTAW, SMAW, SAW, FCAW, etc.), a filler material type 240, a diameter type 242, a weld current 244, a weld voltage 246, a polarity 248, a wire feed speed 250, and/or a travel speed 252.

While example parameters are shown in FIG. 2, parameters may be added, removed, modified, and/or replaced. Furthermore, one or more parameters may be omitted. In some examples, the weld training system 100 may perform a check of a proposed final welding procedure (e.g., when the user selects an "OK" button 254) to avoid incompatible parameters from being set.

The user may download a weld procedure specification configured using the input device and the welding training system 100 to an actual welding quality system. In this manner, a user may simulate one or more specifications, test the specifications, and then select one or more of the specification for use in actual welding.

Figure 3A:
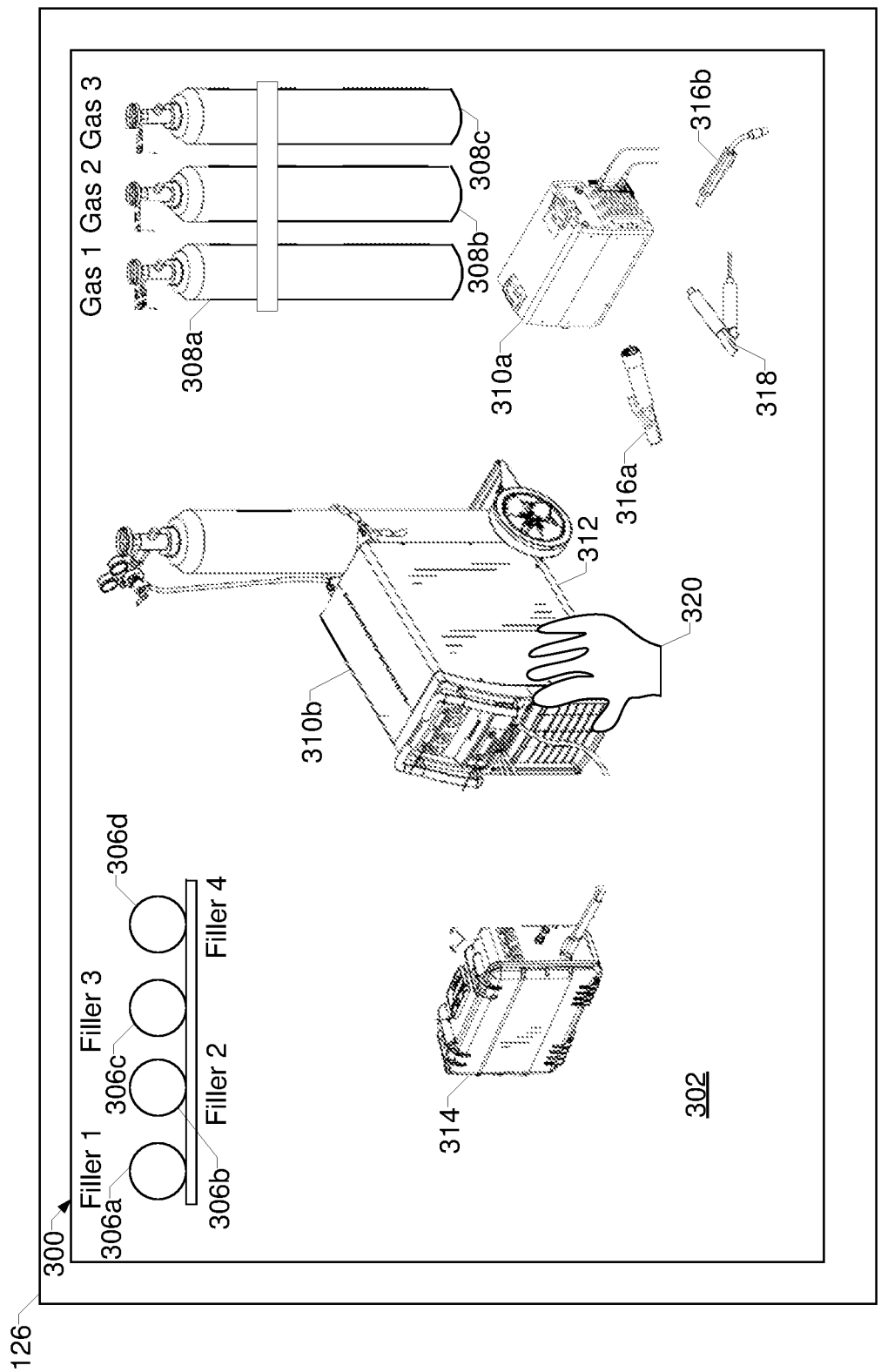
FIG. 3A illustrates a view displayed by the example weld training system of FIG. 1 to enable a user to simulate setting up a simulated physical welding environment using the input device(s) of the weld training system.

FIG. 3A illustrates a view 300 displayed by the example weld training system 100 of FIG. 1 to enable a user to simulate setting up a simulated physical welding environment using the input device(s) 124 of the weld training system 100. The example view 300 may be displayed on the display device(s) 126 of the weld training system 100 as a set scene and/or in response to user navigation of a three-dimensional environment presented by the weld training system 100.

In the example view 300, an area of a welding environment 302 includes welding equipment and materials for selection by the user. For example, the welding environment 302 includes a shelf 304 containing multiple filler materials 306a-306d (e.g., spools of different electrode wires). The welding environment 302 also includes multiple bottles 308a-308c of welding gases that may be selected. The welding environment 302 further includes one or more welding power supplies 310a, 310b, a cart 312, one or more portable wire feeders 314, one or more welding torches 316a, 316b, and a ground cable 318. In some examples, the environment 302 may include protective equipment for selection by the user.

In the example of FIG. 3A, the user controls a cursor 320, which represents the user's hand, for the selection of objects. In other examples, the user may control a weld operator via a first-person or third-person view. Selecting an object 304-318 via the cursor 320 may trigger an animation or other indication that the user has selected the corresponding object. Conversely, the user may also use the cursor 320 to replace an object in the weld environment 302.

Figure 3B:
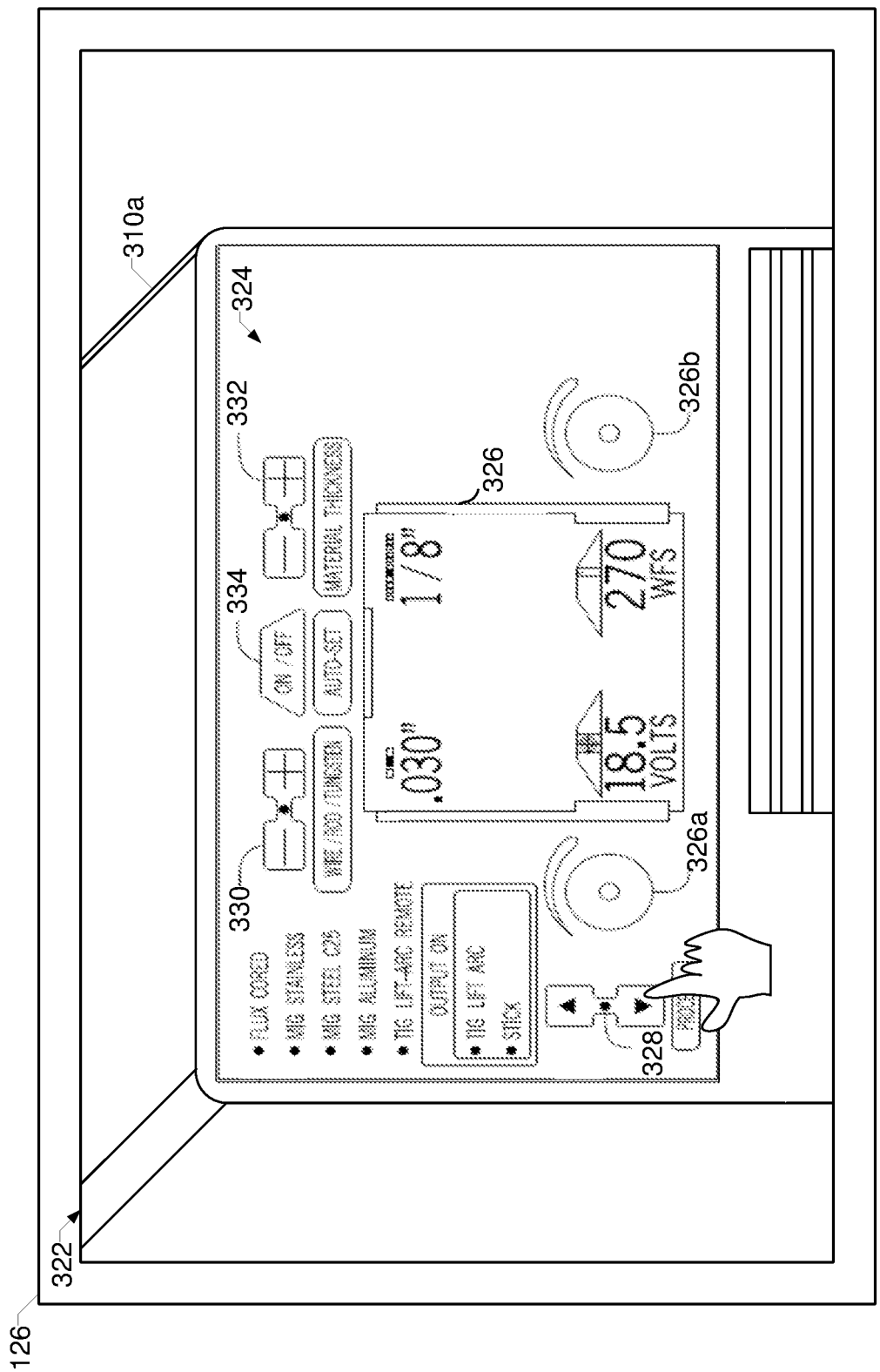
FIG. 3B illustrates a view displayed by the example weld training system of FIG. 1 to enable a user to simulate configuring welding equipment using the input device(s) of the weld training system.

FIG. 3B illustrates a view 322 displayed by the example weld training system 100 of FIG. 1 to enable a user to simulate configuring welding equipment using the input device(s) 126 of the weld training system 100. The example view 322 includes a simulated user interface 324 of welding equipment such as a welding power supply. The weld training system 100 may display the view 322 in response to a user selection to interact with a piece of welding equipment having the user interface 324. The weld training system 100 enables the user to manipulate objects on the simulated user interface 324 (e.g., via the cursor 320) to adjust welding parameters.

The weld training system 100 may select from multiple simulated user interfaces depending on which of multiple welding power supplies the user selected from the welding environment 302. For example, different makes and/or models of welding equipment typically have different features on the user interface 324, which may be reflected on the display device(s) 126 as different user interface inputs and/or outputs to provide the user with a representative view of a piece of welding equipment.

The user interface 324 of FIG. 3B includes a screen 326, software-controlled adjustment knobs 326a, 326b, a process selector 328, a material selector 330, a material thickness selector 332, and an auto-set selection button 334.

Figure 3C:
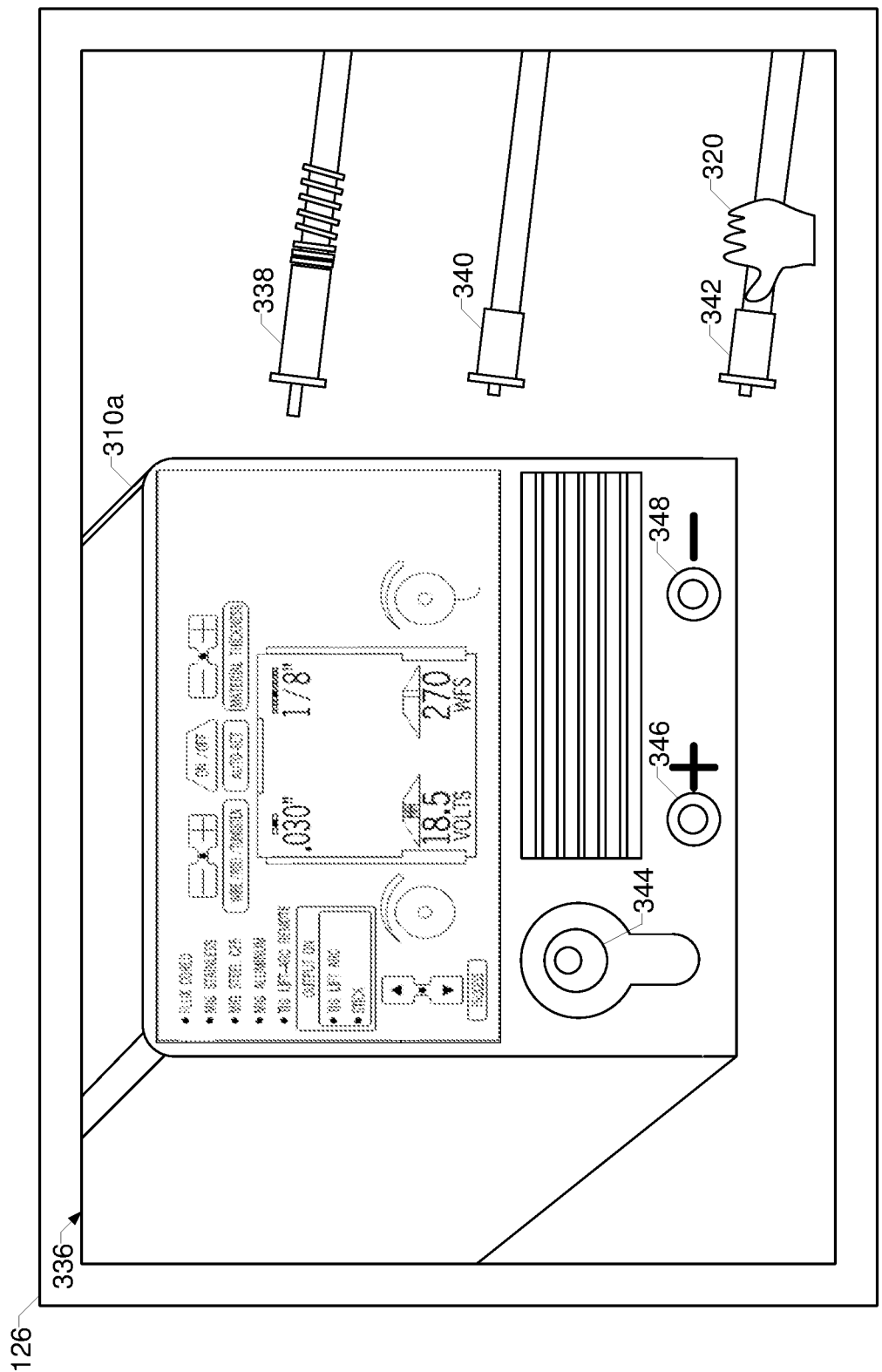
FIG. 3C illustrates a view displayed by the example weld training system of FIG. 1 to enable a user to simulate making electrical connections between one or more welding torches/clamps and welding equipment using the input device(s) of the weld training system.

FIG. 3C illustrates a view 336 displayed by the example weld training system 100 of FIG. 1 to enable a user to simulate making electrical connections between one or more welding torches/clamps 338, 340, 342 and welding equipment (e.g., the welding power supply 310a) using the input device(s) 126 of the weld training system 100. The example view 336 includes electrical connections 344, 346, 348 corresponding to welding equipment such as a welding power supply. The weld training system 100 may display the view 336 in response to a user selection to interact with a piece of welding equipment having the electrical connections. The weld training system 100 enables the user to manipulate objects on the welding equipment (e.g., via the cursor 320) to virtually perform physical configuration of the welding equipment.

The physical configuration performed by the user via the weld training system 100 may affect the resulting welding operation, if the user chooses to simulate the welding operation. For example, the selection of the weld torch and/or the work cable, and/or the connection of the weld torch and/or the work cable to respective ones of the electrical connections 344, 346, 348 may determine the polarity of the electrode during the weld, which in turn determines the heat input to the weld and/or the heat at the electrode during the welding operation. Furthermore, selection of the proper weld torch and connection to the appropriate one of the electrical connection 344, 346, 348 determines the welding process type, among other things.

Additionally or alternatively, the user may virtually perform physical configurations such as attaching a gas supply hose, installing or replacing an electrode reel, installing or replacing a wire liner, connecting a work clamp to a workpiece, preparing a workpiece (e.g., cleaning the workpiece), connecting a power supply to a wire feeder, and/or any other physical activities or configuration involved in preparing for a welding operation. In some examples, the weld training system 100 enables a user to perform workpiece preparation such as preheating with an induction heating system or other known preheating method such as a blowtorch.

Workpiece preparation may be simulated in a similar manner as the welding simulation described herein, with corresponding physical configuration, parameter configuration, equipment selection, and/or environment navigation being performed by the user.

Figure 4:
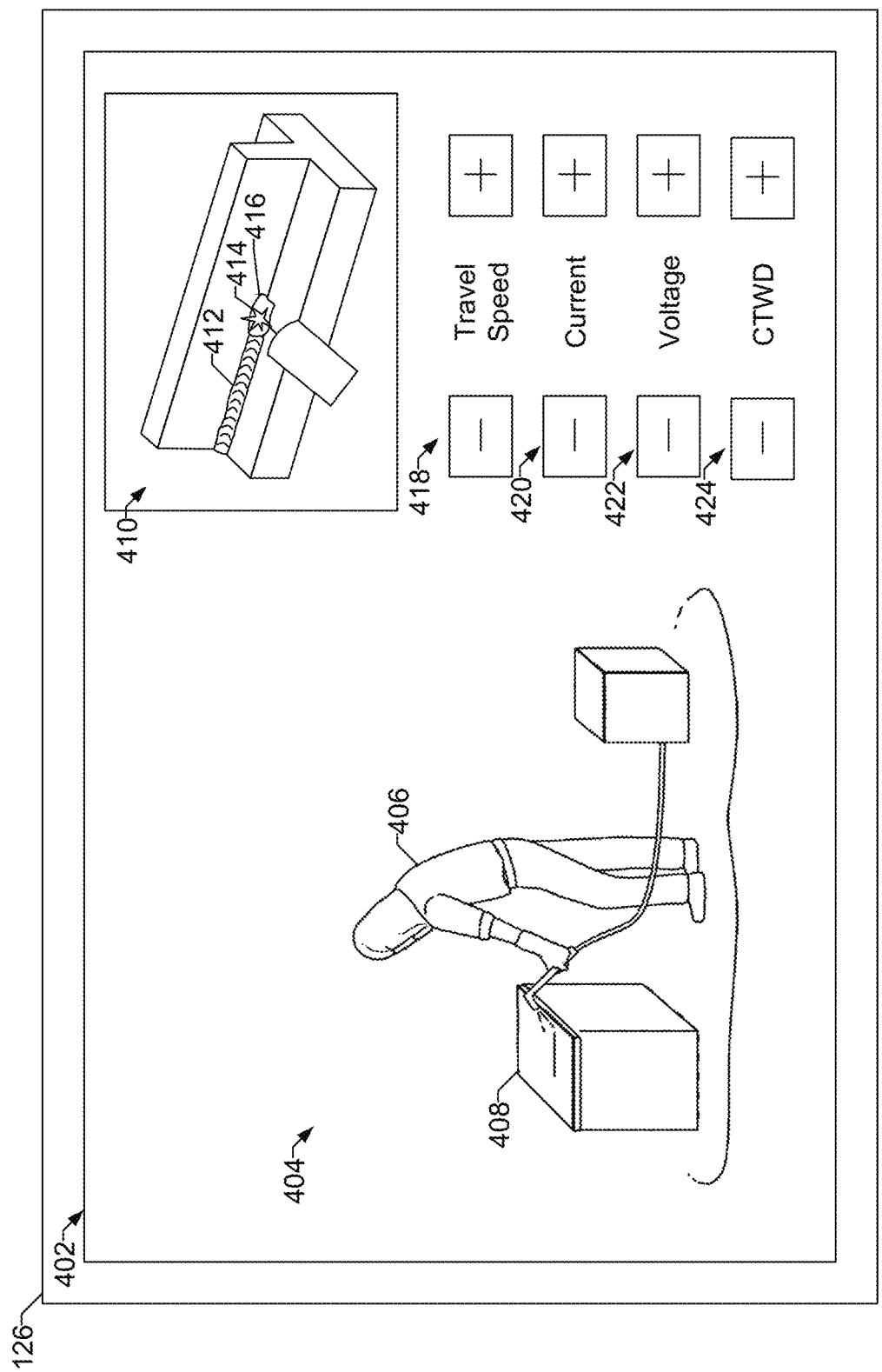
FIG. 4 illustrates a welding presentation interface displayed by the example weld training system of FIG. 1 to display a simulation animation of a welding operation on the display device(s).

FIG. 4 illustrates a welding presentation interface 400 displayed by the example weld training system 100 of FIG. 1 to display a simulation animation 402 of a welding operation on the display device(s) 126. The weld training system 100 displays the simulation animation 402 in response to initiation of the welding operation by the user, and is based on the simulation of the weld using the performance and/or parameters determined by the user's interactions with the weld training system 100 prior to the simulation.

The example weld training system 100 displays a first animation 404 of a virtual weld operator 406 (e.g., a user's avatar), a workpiece 408 (e.g., based on the workpiece selection and/or configuration by the user), and/or welding equipment (e.g., based on the equipment selection and/or configuration by the user). The weld training system 100 displays a second animation 410 that illustrates a weld bead 412, an arc 414, and a weld puddle 416. The first animation 404 provides a view of the posture and technique of the weld operator 406 for the particular welding operation. The second animation provides a more detailed view of the torch travel speed, the behavior of the weld puddle 416 and the resulting weld bead 412.

The simulation animation 410 may include a visual representation of at least one of a weld puddle, slag generated by the welding operation, spatter generated by the welding operation, and/or burn through generated by the welding operation.

In the example of FIG. 4, the weld training system 100 enables the user to effect changes to one or more weld parameters during the welding operation being simulated. For example, the welding presentation interface 400 includes adjustment buttons for torch travel speed 418, weld current 420, weld voltage 422, and/or contact tip to work distance 424. The weld training system 100 updates the parameters used to simulate the welding operation in response to changes in the weld parameters during the welding operation. In some examples, the weld training system 100 includes a pause/resume button to enable the user to pause at a particular point in the simulation to provide time to make one or more parameter changes via the buttons 418-424, and then resume the welding operation with the new parameters.

The user may download welding parameters configured using the input device(s) 124 and the welding training system 100 to a real physical environment or a real work cell. In this manner, the user may simulate one or more sets of parameters in the weld training system 100 and then transfer one or more of the sets of parameters to welding equipment to practice actual welding.

Figure 5:
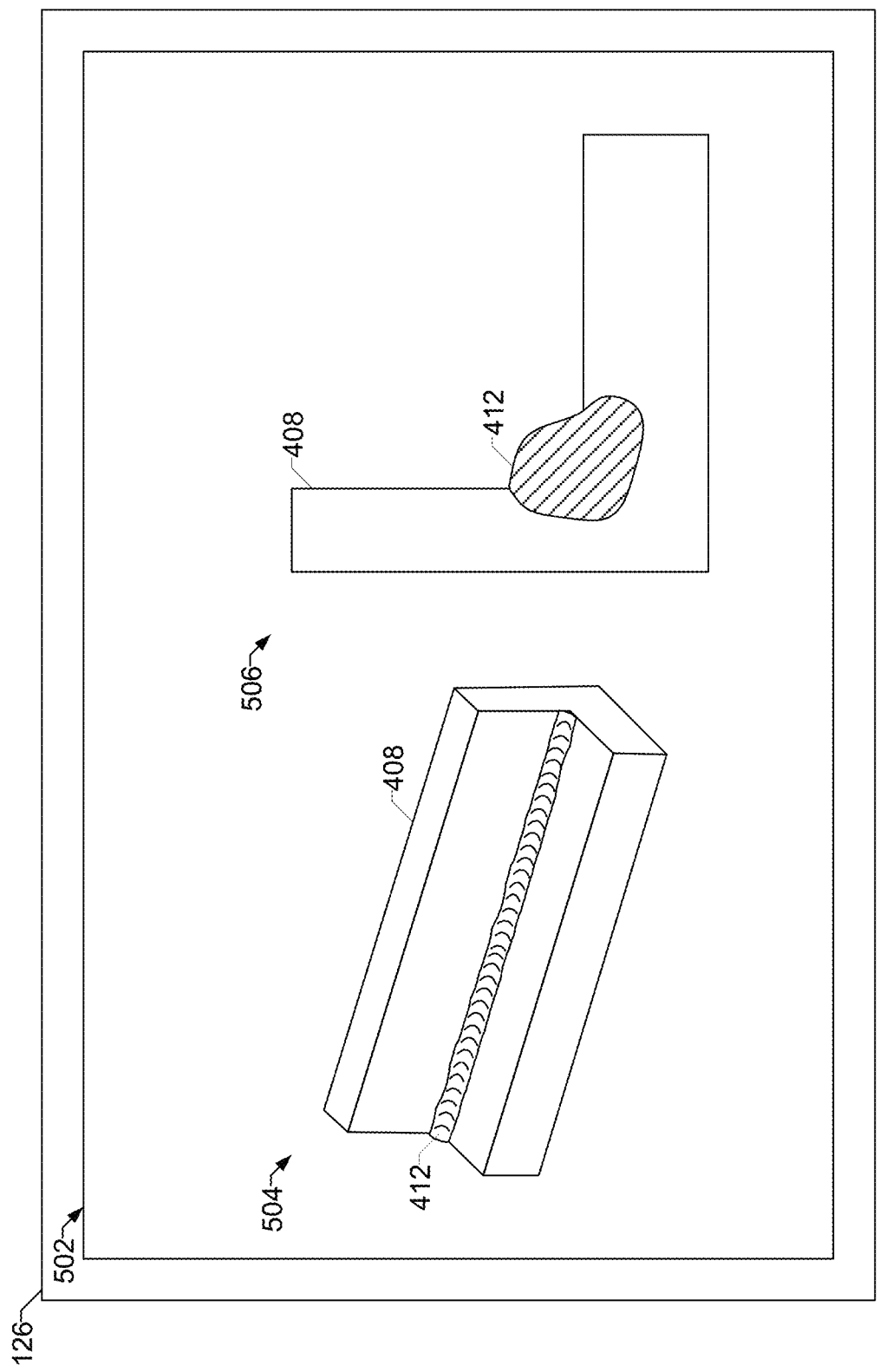
FIG. 5 illustrates a view displayed by the example weld training system of FIG. 1 to display the modeled result of the weld on the display device(s) using an image of a surface of a weld bead and/or a cross-section of the weld bead and the workpiece.

FIG. 5 illustrates a view 502 displayed by the example weld training system 100 of FIG. 1 to display the modeled result of the weld on the display device(s) 126 using an image 504 of a surface of a weld bead (e.g., the weld bead 412 of FIG. 4) and/or a cross-section 506 of the weld bead 412 and the workpiece (e.g., the workpiece 408 of FIG. 4). The modeled result of the weld in the view 502 may indicate anomalies in the modeled result and/or enable the user to more closely visually inspect the modeled result. The modeled result may indicate a cause of an anomaly, a suggested change in one or more of the welding-related variables to avoid the anomaly, or a location of the anomaly in the images of the weld bead or in the cross-section of the weld bead.

In some examples, the modeled result includes a visual representation of at least one of a weld puddle, slag generated by the welding operation, spatter generated by the welding operation, and/or burn through generated by the welding operation.

Figure 6:
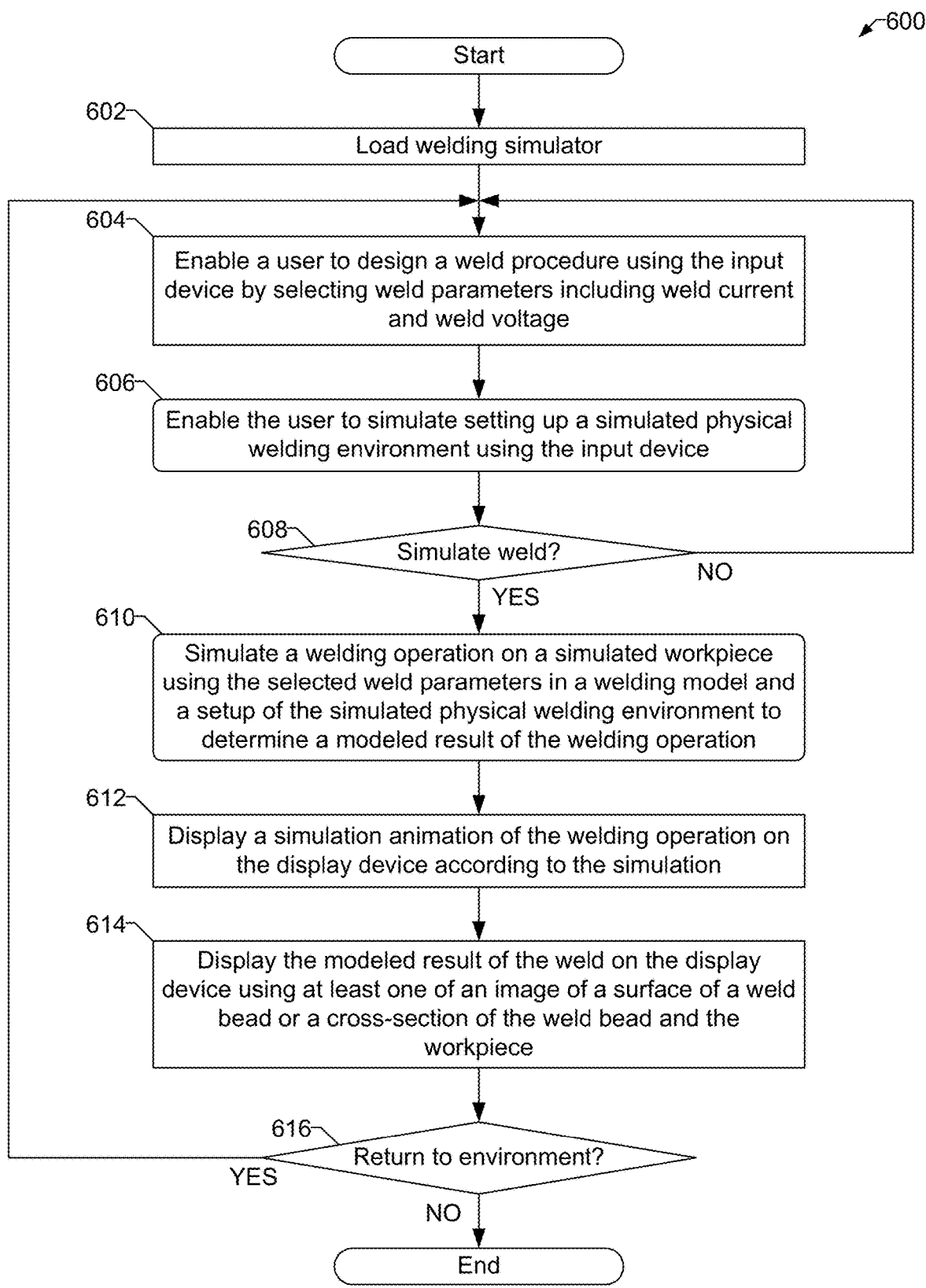
FIG. 6 is a flowchart representative of machine readable instructions which may be executed to implement the weld training system of FIG. 1 to demonstrate to a user an effect of a combination of welding-related variables.

FIG. 6 is a flowchart representative of machine readable instructions 600 which may be executed to implement the weld training system 100 of FIG. 1 to demonstrate to a user an effect of a combination of welding-related variables. The example instructions 600 may be executed by the processor 102 of FIG. 1.

At block 602, the processor 102 loads a welding simulator. The welding simulator may be stored locally and/or downloaded from an external network.

At block 604, the processor 102 enables a user to design a weld procedure using the input device(s) 124 by selecting weld parameters include weld current and weld voltage. For example, the processor 102 may generate and display the weld procedure design interface illustrated in FIG. 3 on the display device(s) 126. The processor 102 stores the weld procedure information input by the user via the input device(s) 124.

At block 606, the processor 102 enables the user to simulate setting up a simulated physical welding environment using the input device(s) 124. For example, the processor 102 enables the user to navigate a physical welding environment (e.g., FIG. 3A), select weld equipment and/or material (e.g., FIG. 3A), simulate configuring weld equipment (e.g., FIG. 3B), and/or physically setting up welding equipment and/or material (e.g., FIG. 3C). Example instructions to implement block 606 are described below with reference to FIG. 7.

At block 608, the processor 102 determines whether the weld is to be simulated. For example, the user may initiate the weld via a "Weld!" button when the welding operation is sufficiently configured. If the weld is not to be simulated (block 608), control returns to block 604 for the user to continue configuration.

When the weld is to be simulated (block 608), at block 610 the processor 102 simulates a welding operation on a simulated workpiece using the selected weld parameters in a welding model and a setup of the simulated physical welding environment to determine a modeled result of the welding operation. Example instructions to implement block 610 are described below with reference to FIG. 8.

At block 612, the processor 102 displays a simulation animation of the welding operation on the display device(s) 126 according to the simulation of block 610. In some examples, blocks 610 and 612 iterate for multiple portions of the simulation.

At block 614, the processor 102 displays a modeled result of the welding operation on the display device(s) 126 using at least one of an image of a surface of a weld bead or a cross-section of the weld bead and the workpiece.

At block 616, the processor 102 determines whether to return to the welding environment. For example, the user may select to exit the welding simulation and return to the virtual welding environment to modify one or more configurations and/or parameters. If the processor 102 is to return to the welding environment (block 616), control returns to block 604. When the user selects not to return to the welding environment (block 616) (e.g., to exit the welding simulation program), the example instructions 600 end.

Figure 7:
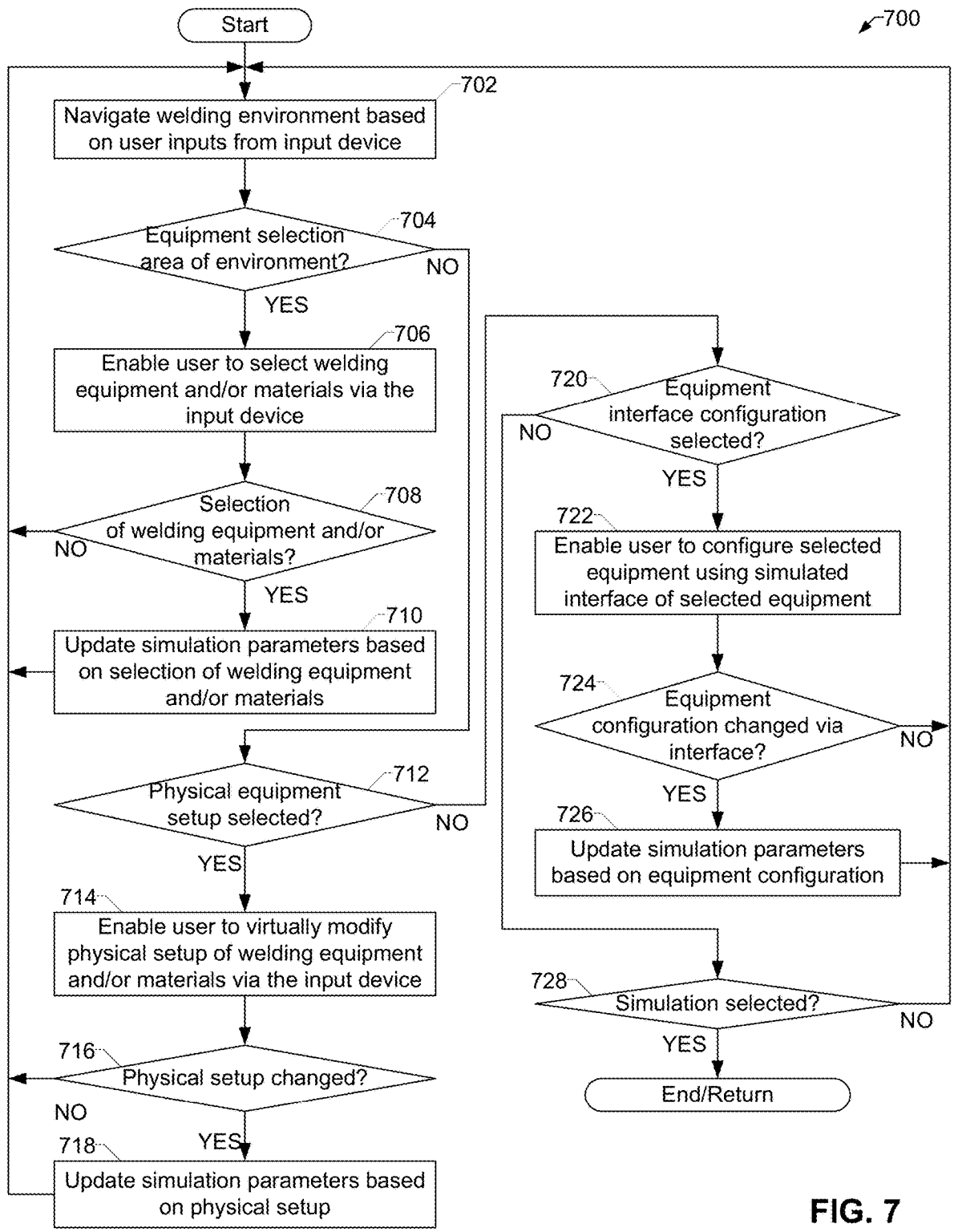
FIG. 7 is a flowchart representative of machine readable instructions which may be executed to implement the weld training system of FIG. 1 to enable a user to simulate setting up a welding environment using an input device of the weld training system.

FIG. 7 is a flowchart representative of machine readable instructions 700 which may be executed to implement the weld training system 100 of FIG. 1 to enable a user to simulate setting up a welding environment using an input device of the weld training system 100. The example instructions 700 may be executed by the processor 102 of FIG. 1 to implement 606 of FIG. 6 to simulate setting up a simulated physical welding environment.

At block 702, the processor 102 navigates a welding environment (e.g., the welding environment 302 of FIG. 3A) based on user inputs from the input device(s) 126.

If the user (e.g., via a user avatar) is in an equipment selection area of the welding environment 302 (block 704), at block 706 the processor 102 enables the user to select welding equipment and/or materials via the input device(s) 126. If the processor 102 detects a selection of welding equipment and/or materials (block 708), at block 710 the processor 102 updates simulation parameters based on the selection of welding equipment and/or materials.

If the user is not in the equipment selection area of the environment (block 704), at block 712 the processor 102 determines if the user has requested a physical equipment setup interface (e.g., the view 322 of FIG. 3B). For example, the user may request the physical equipment setup interface corresponding to a particular piece of welding equipment. If the user has requested a physical equipment setup interface (block 712), the processor 102 enables the user to virtually modify a physical setup of welding equipment and/or materials via the input device(s) 126.

At block 716, the processor 102 determines whether a physical setup (e.g., of the welding equipment) has changed (e.g., by action of the user). For example, the user may manipulate the input device(s) 126 to virtually perform a set up procedure using the selected welding equipment and/or the selected materials, such as attaching a gas supply hose, installing or replacing an electrode reel, installing or replacing a wire liner, connecting a work clamp to a workpiece, preparing a workpiece (e.g., cleaning the workpiece), connecting a power supply to a wire feeder, and/or any other physical activities or configuration involved in preparing for a welding operation.

If the user changes the physical setup (block 716), at block 718 the processor 102 updates the simulation parameters based on the changes to the physical setup.

If the user has not selected physical equipment setup (block 712), at block 720 the processor 102 determines if the user has requested to perform configuration via an equipment interface. For example, the user may select welding equipment for configuration via a virtualized user interface on the welding equipment. If the user selects the equipment interface configuration (block 720), at block 722 the processor 102 enables the user to configure the selected equipment using a simulated interface of the selected equipment.

At block 724, the processor 102 determines whether the user changed the equipment configuration via the equipment interface. If the equipment configuration has been changed via the interface (block 724), the processor 102 updates the simulation parameters based on the equipment configurations.

If the user selects the equipment interface configuration (block 720), at block 728 the processor 102 determines whether the user has selected to perform the simulation. If performance of the simulation has been selected (block 728), the example instructions 700 may end and return control to a calling function such as block 606 of FIG. 6.

After updating the simulation parameters (block 710, block 718, and/or block 726), if there is no selection of welding equipment and/or materials (block 708), if there is no change to a physical setup (block 716), if there is no change to the equipment configuration via the equipment interface (block 724), or if the simulation has not been selected (block 718), control returns to block 702 to continue navigating the welding environment 302 and/or updating one or more configurations and/or parameters.

Figure 8:
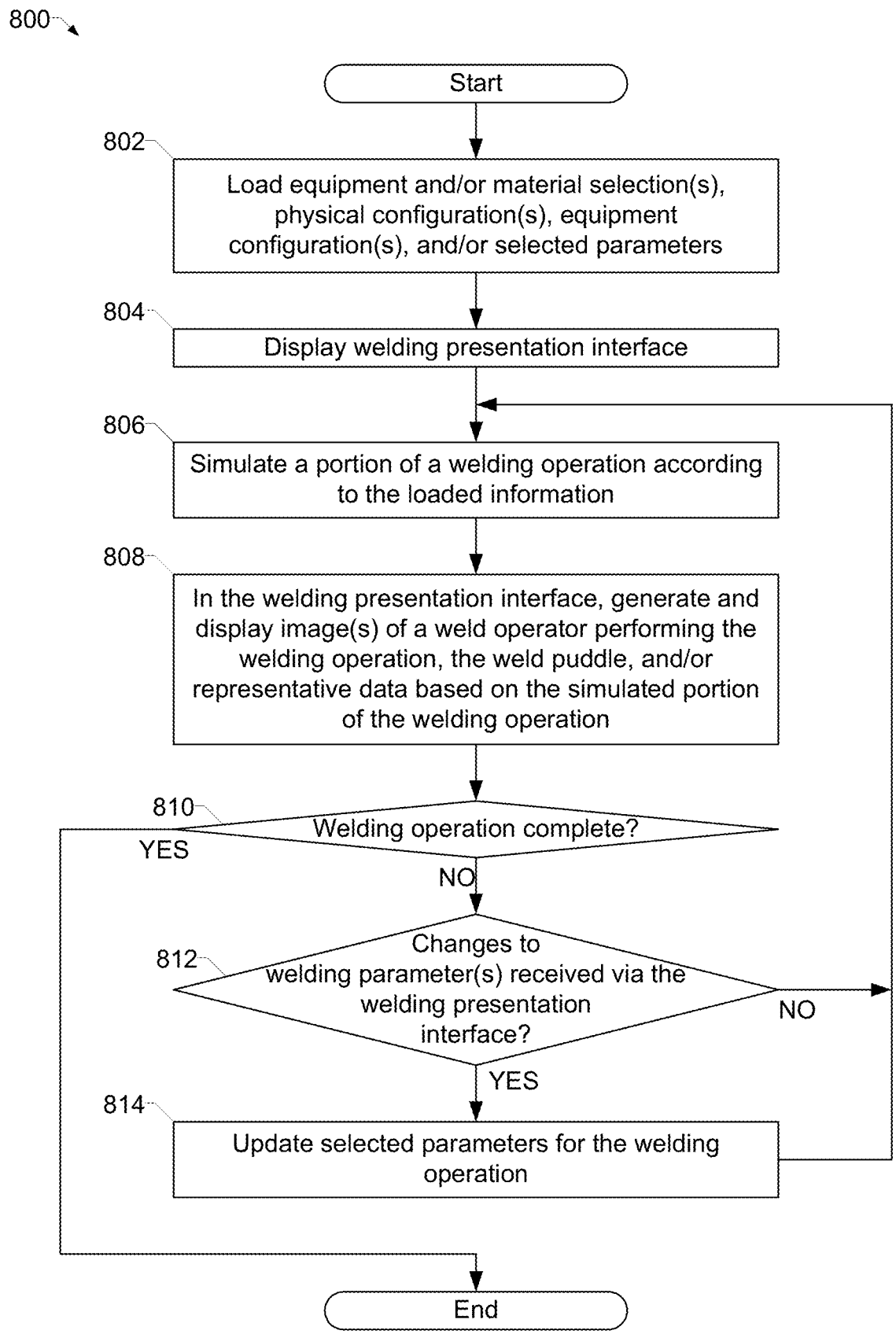
FIG. 8 is a flowchart representative of machine readable instructions which may be executed to implement the weld training system of FIG. 1 to simulate a welding operation on a simulated workpiece to determine a modeled result of the welding operation.

FIG. 8 is a flowchart representative of machine readable instructions 800 which may be executed to implement the weld training system 100 of FIG. 1 to simulate a welding operation on a simulated workpiece to determine a modeled result of the welding operation. The example instructions 800 may be executed by the processor 102 of FIG. 1 to implement 610 of FIG. 6 to simulate a welding operation.

At block 802, the processor 102 loads equipment and/or material selections, physical configurations, equipment configurations, and/or selected parameters. The equipment and/or material selections, physical configurations, equipment configurations, and/or selected parameters are based on the user's prior performance in the welding environment.

At block 804, the processor 102 displays a welding presentation interface (e.g., the interface 400 of FIG. 4).

At block 806, the processor 102 simulates a portion of a welding operation according to the loaded information. For example, the processor 102 may simulate one or more time segments and/or weld distances.

At block 808, the processor 102 generates and displays image(s) (e.g., in the welding presentation interface 400) of a weld operator performance the welding operation, the weld puddle, and/or representative data based on the simulated portion of the welding operation.

At block 810, the processor 102 determines whether the welding operation is complete (e.g., whether the final portion of the welding operation has been simulated).

If the welding operation is not complete (block 810), at block 812 the processor 102 determines whether changes to the welding parameter(s) have been received (e.g., via the welding presentation interface 400). For example, the processor 102 may determine if the user has made changes to the welding parameters (e.g., via the buttons 418-424). If changes to the welding parameter(s) have not been made (block 812), control returns to block 806.

If changes to the welding parameter(s) have been made (block 812), at block 814 the processor 102 updates selected parameters for the welding operation. After updating the selected parameters (block 814), control returns to block 806 to simulate the next portion of the welding operation using the updated parameters.

When the welding operation is complete (block 810), the example instructions 800 end and control returns to a calling function such as block 610 of FIG. 6.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A weld training device, comprising:
   a display device;
   an input device;
   a processor; and
   a machine readable storage device comprising machine readable instructions which, when executed by the processor, cause the processor to demonstrate to a user an effect of a combination of welding-related variables by:
      enabling the user to design a weld procedure using the input device by selecting weld parameters including weld current and weld voltage;
      enabling the user to simulate setting up a simulated physical welding environment using the input device by simulating at least one of physically configuring welding equipment materials, or physically manipulating an interface of the welding equipment, wherein at least one of the interface of the welding equipment or the welding equipment materials is simulated based on a selection of the welding equipment;
   simulating a welding operation on a simulated workpiece using the selected weld parameters in a welding model and the setup of the simulated physical welding environment to determine a modeled result of the welding operation;
   displaying a simulation animation of the welding operation on the display device according to the simulation; and
   displaying the modeled result of the weld on the display device using at least one of an image of a surface of a weld bead or a cross-section of the weld bead and the simulated workpiece.

2. A weld training device as defined in claim 1, comprising:
   a display device;
   an input device;
   a processor; and
   a machine readable storage device comprising machine readable instructions which, when executed by the processor, cause the processor to demonstrate to a user an effect of a combination of welding-related variables by:
      enabling the user to design a weld procedure using the input device by selecting weld parameters including weld current and weld voltage;

enabling the user to simulate setting up a simulated physical welding environment using the input device;

enabling the user to select a welding power supply model;

simulating a welding operation on a simulated workpiece based on the selection of the welding power supply model and using the selected weld parameters in a welding model and the setup of the simulated physical welding environment to determine a modeled result of the welding operation;

displaying a simulation animation of the welding operation on the display device according to the simulation; and displaying the modeled result of the weld on the display device using at least one of an image of a surface of a weld bead or a cross-section of the weld bead and the simulated workpiece.

3. The weld training device as defined in claim 1, wherein the machine readable instructions are further to cause the processor to enable the user to select a wire feed speed, and to simulate the welding operation based on the selection of the wire feed speed.

4. The weld training device as defined in claim 1, wherein the machine readable instructions are further to cause the processor to enable the user to select at least one of a workpiece material or a filler type, and to simulate the welding operation based on the selection of the workpiece material or the selection of the filler type.

5. The weld training device as defined in claim 1, wherein the machine readable instructions are further to cause the processor to enable the user to select a torch travel speed, and to simulate the welding operation based on the selection of the selection of the torch travel speed.

6. The weld training device as defined in claim 5, wherein the machine readable instructions are further to cause the processor to enable the user to control the torch travel speed during the simulation using the input device, and to update the simulation of the welding operation based on changes in the torch travel speed.

7. The weld training device as defined in claim 1, wherein the machine readable instructions are to cause the processor to enable the user to add variation to at least one of a torch travel speed or a contact tip to work distance.

8. The weld training device as defined in claim 1, wherein the modeled result includes a visual representation of at least one of a weld puddle, slag generated by the welding operation, spatter generated by the welding operation, or burn through generated by the welding operation.

9. The weld training device as defined in claim 1, wherein the simulation animation includes a visual representation of at least one of a weld puddle, slag generated by the welding operation, spatter generated by the welding operation, or burn through generated by the welding operation.

10. The weld training device as defined in claim 1, wherein the weld training device comprises a personal computer, a laptop computer, a server, a tablet computer, or a smartphone.

11. The weld training device as defined in claim 1, wherein the machine readable instructions are further to cause the processor to enable the user to change at least one of the weld current, the weld voltage, or a wire feed speed during the simulation, and to update the simulation of the welding operation based on changes in the weld current, the weld voltage, or the wire feed speed.

12. The weld training device as defined in claim 1, wherein the machine readable instructions are further to cause the processor to enable the user to specify at least one of a welding gas type, a gas flow rate, or an ambient airflow, and to simulate the welding operation based on the selection of the welding gas type or the selection of the gas flow rate, or the ambient airflow.

13. The weld training device as defined in claim 1, wherein the machine readable instructions are further to cause the processor to display information about an anomaly present in the weld determined based on the simulation.

14. The weld training device as defined in claim 13, wherein the machine readable information about the anomaly comprises at least one of a cause of the anomaly, a suggested change in one or more of the welding-related variables to avoid the anomaly, or a location of the anomaly in the image of the weld bead or in the cross-section of the weld bead.

15. The weld training device as defined in claim 1, wherein the input device is at least one of a keyboard, a mouse, or a touchscreen.

16. The weld training device as defined in claim 1, wherein the machine readable instructions cause the processor to simulate is performed without further user input after the selection of the weld procedure is accepted.

17. The weld training device as defined in claim 1, wherein the machine readable instructions cause the processor to include at least one of an operator or a robot in the simulation animation.

18. The weld training device as defined in claim 1, wherein the machine readable instructions cause the processor to enable the user to simulate setting up the simulated physical welding environment by at least one of: selecting a welding task from a plurality of welding tasks, reviewing a selecting a welding gas from a plurality of welding gas bottles in the weld cell, selecting at least one of a wire type or a gas, or going through set up procedure using hard goods and gas.

19. The weld training device as defined in claim 1, wherein the machine readable instructions are to cause the processor to simulate the setting up of the simulated physical welding environment by simulating an interface to enable the user to at least one of: check a welding gas bottle for connection problems; check electrical connections for electrical issues;

load a filler reel into a wire feeder; installing a contact tip, a diffuser, and a nozzle; installing a wire liner; attaching a gas supply to welding equipment; installing an electrode reel; connecting a work clamp to a workpiece; preparing the workpiece; or connecting a power supply to the wire feeder.

20. The weld training device as defined in claim 1, wherein the machine readable instructions are to cause the processor to simulate the simulated physical welding environment by including virtual representations of one or more of: a welding gas bottle, a gas regulator, a gas hose, a wire feeder, welding electrodes, a drive roll, access to utility power, a torch, a contact tip, a work clamp, a fume extraction mechanism, a liquid torch cooler, and welding protective equipment.

21. A weld training device as defined in claim 1, comprising:

a display device;

an input device;

a processor; and a machine readable storage device comprising machine readable instructions which, when executed by the processor, cause the processor to demonstrate to a user an effect of a combination of welding-related variables by:

enabling the user to design a weld procedure using the input device by selecting weld parameters including weld current and weld voltage;

enabling the user to simulate setting up a simulated physical welding environment using the input device;

simulating a welding operation on a simulated workpiece and using the selected weld parameters in a welding model and the setup of the simulated physical welding environment to determine a modeled result of the welding operation;

displaying a simulation animation of the welding operation on the display device according to the simulation; and displaying the modeled result of the weld on the display device using at least one of an image of a surface of a weld bead or a cross-section of the weld bead and the simulated workpiece, wherein the machine readable instructions are further to cause the processor to downloading welding parameters configured by the user using the input device to a real physical environment or a real work cell.

22. A weld training device, comprising:

a display device;

an input device;

a processor; and a machine readable storage device comprising machine readable instructions which, when executed by the processor, cause the processor to demonstrate to a user an effect of a combination of welding-related variables by:

enabling the user to design a weld procedure using the input device by selecting weld parameters including weld current and weld voltage;

enabling the user to simulate setting up a simulated physical welding environment using the input device;

simulating a welding operation on a simulated workpiece and using the selected weld parameters in a welding model and the setup of the simulated physical welding environment to determine a modeled result of the welding operation;

displaying a simulation animation of the welding operation on the display device according to the simulation; and displaying the modeled result of the weld on the display device using at least one of an image of a surface of a weld bead or a cross-section of the weld bead and the simulated workpiece, wherein the machine readable instructions are to cause the processor to download a weld procedure specification configured by the user using the input device to an external system for use in actual welding.

* * * * *